(12) United States Patent
Xiao

(10) Patent No.: US 6,244,704 B1
(45) Date of Patent: Jun. 12, 2001

(54) UNIVERSAL SHELTER FRAME WITH ADJUSTABLE BRIDGE ARRANGEMENT

(76) Inventor: Tony Xin Xiao, 1235 Lindengrove Ave., Rowland Heights, CA (US) 91748

( * ) Notice: Subject to any disclaimer, the term of this patent is extended or adjusted under 35 U.S.C. 154(b) by 0 days.

(21) Appl. No.: 09/524,970

(22) Filed: Mar. 14, 2000

Related U.S. Application Data

(60) Provisional application No. 60/170,613, filed on Dec. 14, 1999.

(51) Int. Cl.[7] .................................................... G02C 9/00
(52) U.S. Cl. .............................. 351/47; 351/57; 351/128
(58) Field of Search ................................ 351/47, 48, 57, 351/58, 44, 41

(56) References Cited

U.S. PATENT DOCUMENTS 5,801,804 * 9/1998 Dennise ................................. 351/47

* cited by examiner

Primary Examiner—Hung Xuan Dang
(74) Attorney, Agent, or Firm—Raymond Y. Chan; David and Raymond Patent Group

(57) ABSTRACT

A universal shelter frame for attaching to a primary spectacle frame having two primary lenses mounted thereon, wherein the universal shelter frame includes a pair of shelter lenses each having an inner side facing with each other, a pair of connecting members which are affixed to the two inner sides of the two shelter lenses respectively, and an adjustable bridge arrangement connected between the two shelter lenses together for supporting the two shelter lenses apart and forming a bridge distance between the two shelter lenses. The adjustable bridge arrangement includes at least one compression unit for enabling the adjustable bridge arrangement to be compressed to contract the bridge distance in order to mount the shelter frame on the primary spectacle frame by attaching the two connecting members to two inner edges of the primary lenses of the primary spectacle frame respectively. Therefore, the user can easily attach the universal shelter frame to the primary spectacle frame with one hand, even when the primary spectacle frame is still wearing on the user's face.

33 Claims, 12 Drawing Sheets

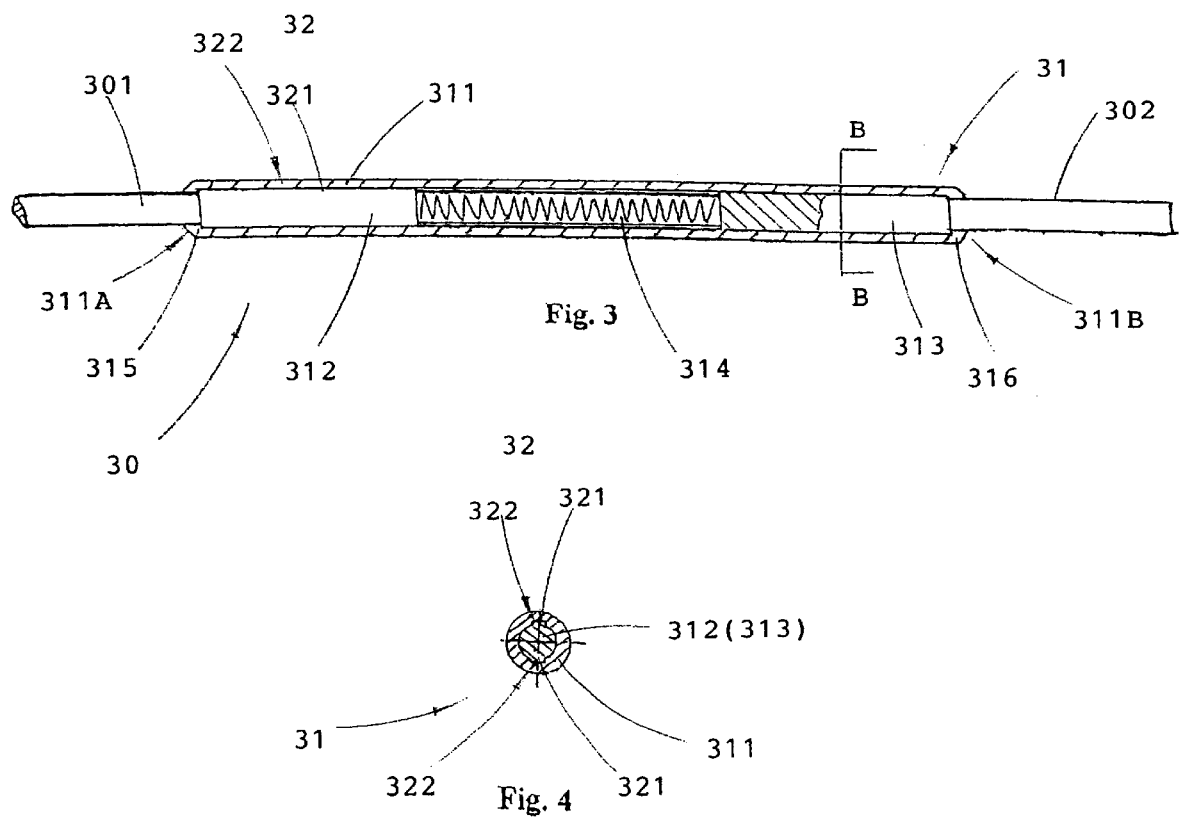

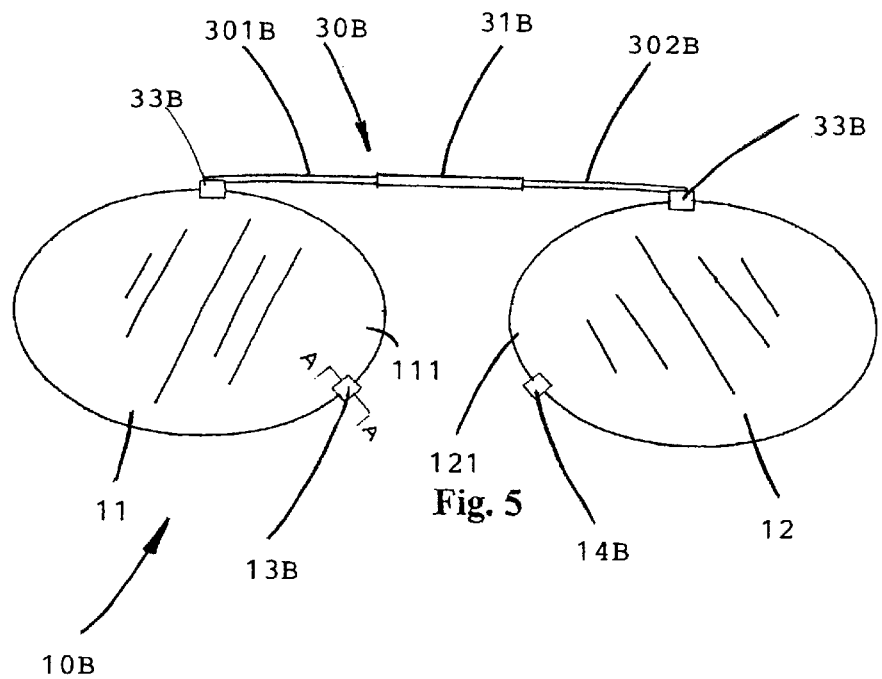
Fig. 5
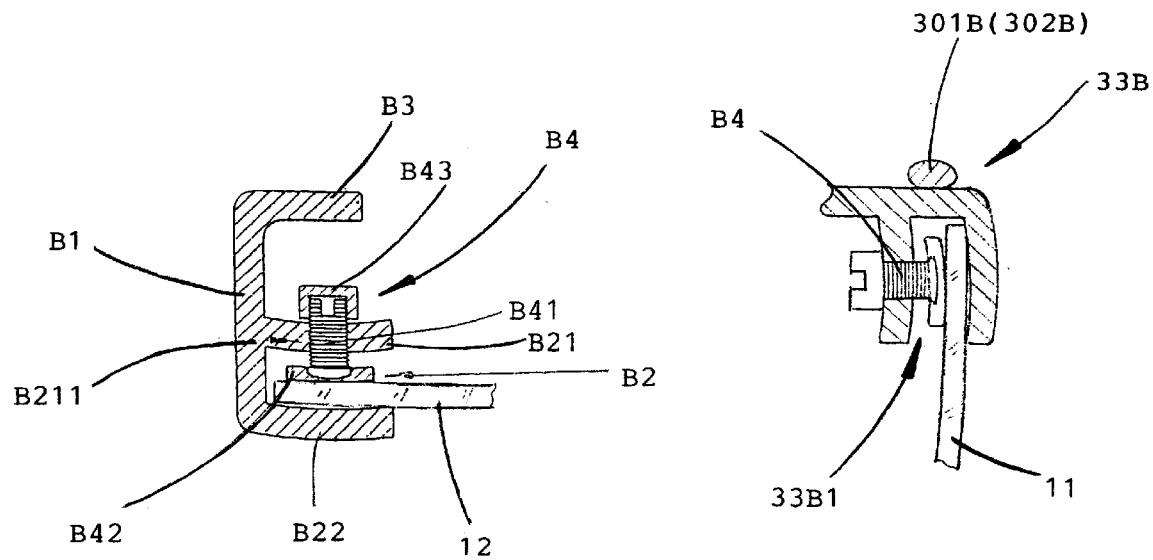
Fig. 6
Fig. 7

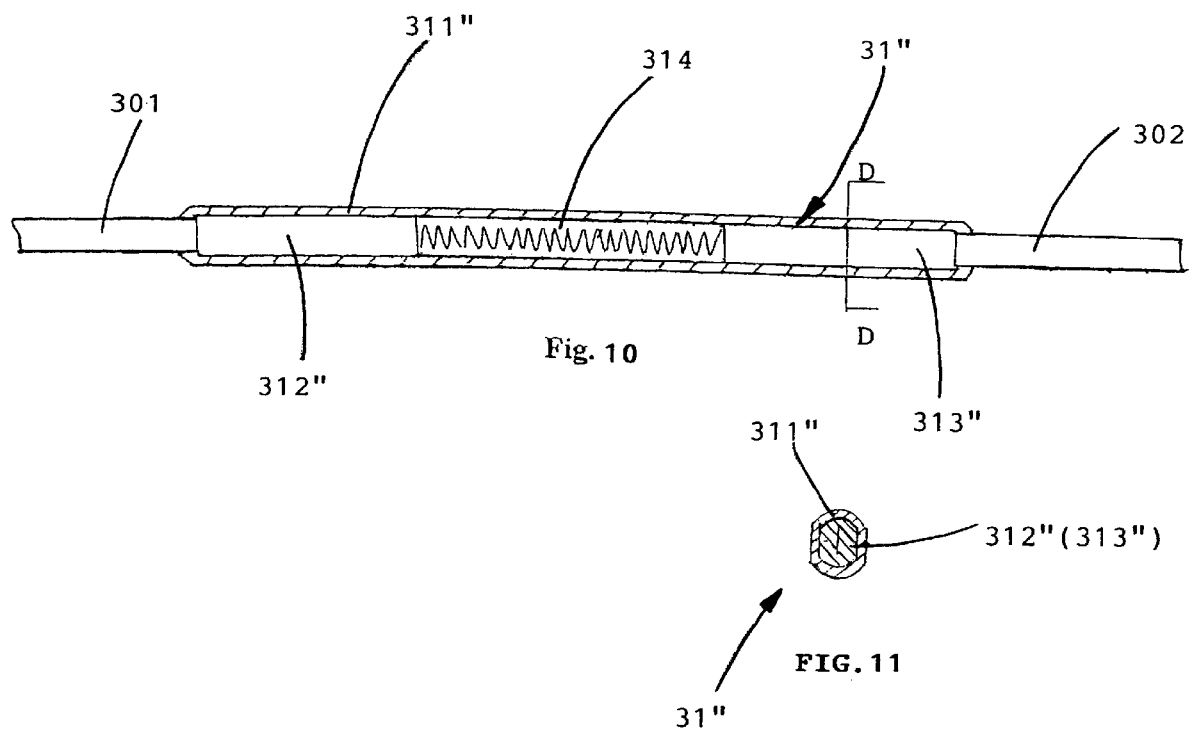

UNIVERSAL SHELTER FRAME WITH ADJUSTABLE BRIDGE ARRANGEMENT

CROSS REFERENCE OF THE RELATED APPLICATION

This is a regular application of a provisional application having a provisional application number of 60/170,613 and a provisional filing date of Dec. 14, 1999.

BACKGROUND OF THE PRESENT INVENTION

The present invention relates to shelter frame for eyeglasses, and more particularly to a universal shelter frame employed with an adjustable bridge arrangement which is adjustably arranged to fittingly and easily attach the shelter frame to different kinds of primary spectacle frame.

An auxiliary shelter frame is widely used today. A conventional shelter frame such as sunglasses is constructed to detachably mount on shortsighted or longsighted eyeglasses so that wearer does not need to pay for and carry another shortsighted or longsighted sunglasses. The conventional shelter frame generally comprises two lens frames for mounting two auxiliary lenses, a bridge connected between the two lens frames, and a plurality of clipping claws for mounting the shelter frame on a primary spectacle frame. However, the conventional shelter frame has the following drawbacks:

1. A wearer has difficulty to mount the conventional shelter frame on a primary spectacles frame because the conventional shelter frame requires both hands to operate the clipping claws in order to correctly align and clip the shelter frame on the primary spectacles frame. The mounting operation is based on the wearer's experience.
2. Each conventional shelter frame is custom made to fit a corresponding style and size of primary spectacle frame wherein the size and shape of the shelter frame must be the same as that of the primary spectacle frame. So, when a wearer changes his or her primary spectacle frame, he or she must buy another corresponding shelter frame.
3. The conventional shelter frame is attached to the primary spectacle frame merely by clipping its claws on the lens frames of the primary spectacle frame. Accordingly, although the conventional shelter frame must be made to perfectly fit the primary spectacle frame, the claws may still accidentally detach from the primary spectacle frame during exercise and sporting activities.
4. The conventional shelter frame requires both hands operation for aligning the shelter frame on the primary spectacle frame in position and mounting on the primary spectacle frame. It is dangerous that the wearer needs both hands to operate the conventional shelter frame especially while he or she is driving.

SUMMARY OF THE PRESENT INVENTION

A main object of the present invention is to provide a universal shelter frame employed with an adjustable bridge arrangement, which is adjustably arranged to fittingly attach the shelter frame to different kinds of primary spectacle frame.

Another object of the present invention is to provide a universal shelter frame with an adjustable bridge arrangement, wherein the user can easily attach the universal shelter frame to the primary spectacle frame with one hand, even when the primary spectacle frame is still wearing on the user's face.

Another object of the present invention is to provide a universal shelter frame with an adjustable bridge arrangement, wherein the user can easily detach the universal shelter frame from the primary spectacle frame with one hand, even when the primary spectacle frame is still wearing on the user's face.

Another object of the present invention is to provide a universal shelter frame with an adjustable bridge arrangement, wherein after the universal shelter frame is attached to the primary spectacle frame, the adjustable bridge arrangement can enhance the attachment of the universal shelter frame on the primary spectacle frame by pressing the claws against the lens frame of the primary spectacle frame.

Another object of the present invention is to provide a universal shelter frame with an adjustable bridge arrangement, wherein since the adjustable bridge arrangement produces an outward force pressing the inner claws of the universal shelter frame against the primary spectacle frame, the outer claws of the conventional shelter frame can thus be eliminated in the present invention.

Another object of the present invention is to provide a universal shelter frame with adjustable bridge arrangement, which can reduce the possibility of scratching the lenses by the clipping claw because lesser clipping claws are required in the present invention.

Another object of the present invention is to provide a universal shelter frame with adjustable bridge arrangement wherein the wearer can easily make his or her favorite sun lenses according to his or her own original primary spectacles.

Accordingly, in order to accomplish the above objects, the present invention provides a universal shelter frame for attaching to a primary spectacle frame having two primary lenses mounted thereon, wherein the universal shelter frame comprises:

a pair of shelter lenses each having an inner side facing with each other;

a pair of connecting members which are affixed to the two inner sides of the two shelter lenses respectively; and an adjustable bridge arrangement connected between the two shelter lenses together for supporting the two shelter lenses apart and forming a bridge distance between the two shelter lenses, wherein the bridge distance is normally longer than a distance between the two primary lenses of the primary spectacle frame, wherein the adjustable bridge arrangement comprises at least one compression unit for enabling the adjustable bridge arrangement to be compressed to contract the bridge distance in order to mount the shelter frame on the primary spectacle frame by attaching the two connecting members to two inner edges of the primary lenses of the primary spectacle frame respectively, moreover the contracted adjustable bridge arrangement provides an extending force to press the two connecting members outwardly against the two inner sides of the two primary lenses so as to firmly mount the shelter frame on the primary spectacle frame.

BRIEF DESCRIPTION OF THE DRAWINGS

FIG. 3 is a partially sectional view of the adjustable bridge arrangement according to the above first preferred embodiment of the present invention.

FIG. 4 is a cross sectional view of the adjustable bridge arrangement according to the above first preferred embodiment of the present invention, illustrating a cross sectional structure along the section line B—B in FIG. 3.

FIG. 5 is a front view of a universal shelter frame with adjustable bridge arrangement according to a second preferred embodiment of the present invention.

FIG. 6 is a sectional view of a detachable connecting member according to the above second preferred embodiment of the present invention.

FIG. 7 is a sectional view of a detachable connector of the adjustable bridge arrangement according to the above second preferred embodiment of the present.

FIG. 10 is a partially sectional view of a second alternative mode of the adjustable bridge arrangement according to the above first and second preferred embodiments of the present invention.

FIG. 11 is a cross sectional view of the second alternative mode of the adjustable bridge arrangement according to the above first and second preferred embodiments of the present invention, illustrating a cross sectional structure along the section line D—D in FIG. 10.

DETAILED DESCRIPTION OF THE PREFERRED EMBODIMENT

Referring to FIGS. 1 to 4 of the drawings, a universal shelter frame 10 according to a first preferred embodiment of the present invention is illustrated, wherein the universal shelter frame 10 is adapted for attaching to a primary spectacle frame 20 comprising two primary lenses 21, 22 connected between a bridge 23.

Figure 1:
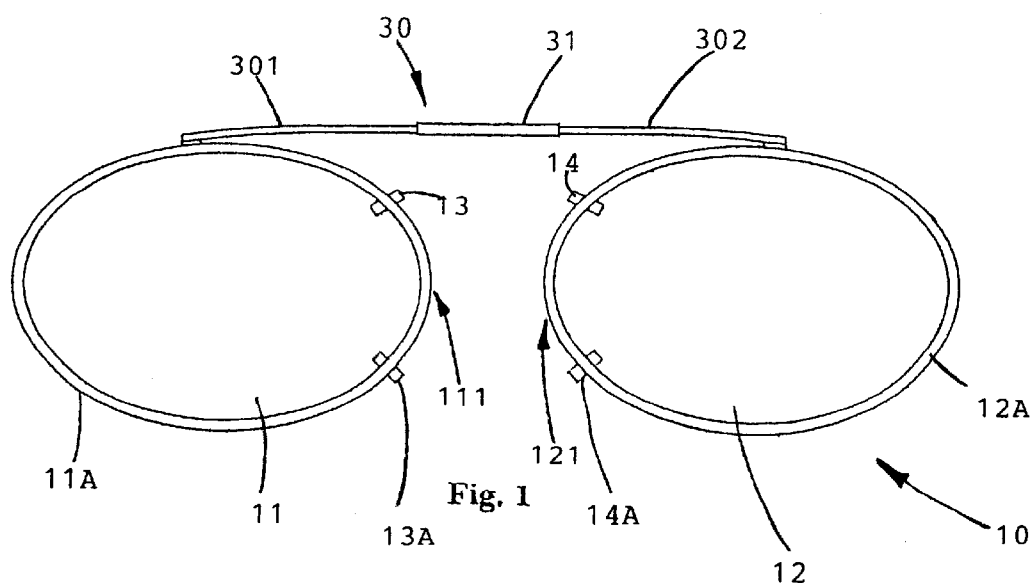
FIG. 1 is a front view of a universal shelter frame with adjustable bridge arrangement according to a first preferred embodiment of the present invention.
Figure 2:
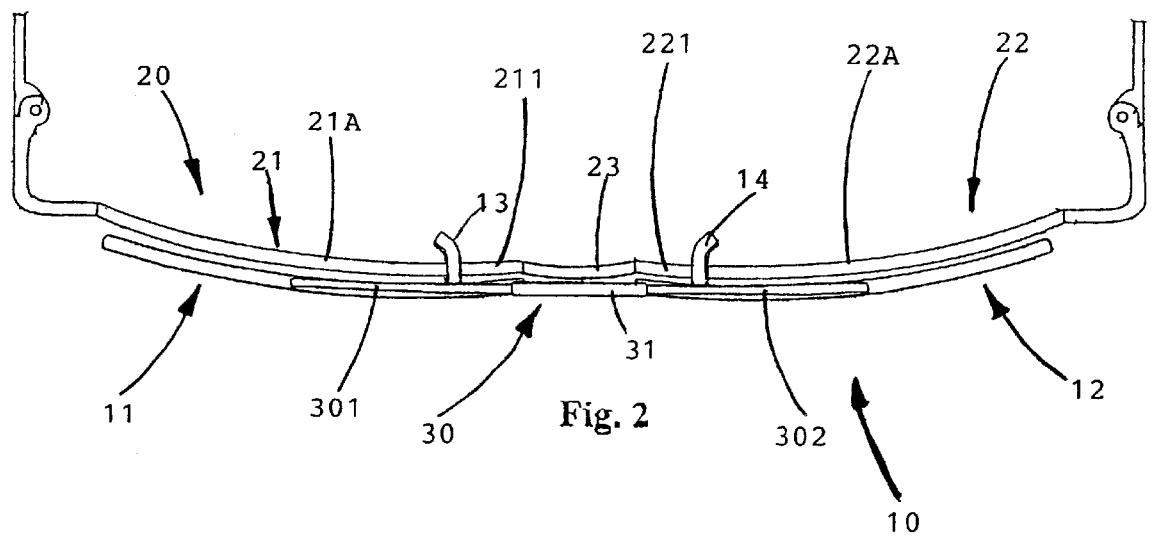
FIG. 2 is a top view of the universal shelter frame with adjustable bridge arrangement according to the above first preferred embodiment of the present invention.

As shown in FIGS. 1 and 2, the universal shelter frame 10 comprises a pair of shelter lenses 11, 12, at least a pair of connecting members 13, 14, and an adjustable bridge arrangement 30.

Each of the shelter lenses 11, 12 has an inner side 111, 121 facing with each other. The pair of connecting members 13, 14 are affixed to the two inner sides 111, 121 of the two shelter lenses 11, 12 respectively. The adjustable bridge arrangement 30 is connected between the two shelter lenses 11, 12 together for supporting the two shelter lenses 11, 12 apart and forming a bridge distance between the two shelter lenses 11, 12, wherein the bridge distance is normally longer than a distance between the two primary lenses 21, 22 of the primary spectacle frame 20.

The adjustable bridge arrangement 30 comprises at least one compression unit 31 for enabling the adjustable bridge arrangement 30 to be compressed to contract the bridge distance in order to mount the shelter frame 10 on the primary spectacle frame 20 by attaching the two connecting members 13, 14 to two inner edges 211, 221 of the primary lenses 21, 22 of the primary spectacle frame 20 respectively, moreover the contracted adjustable bridge arrangement 30 provides an extending force to press the two connecting members 13, 14 outwardly against the two inner edges 211, 221 of the two primary lenses 21, 22 so as to firmly mount the shelter frame 10 on the primary spectacle frame 20.

According to the first embodiment as shown in FIGS. 1 to 4, the universal shelter frame 10 comprises two lens frames 11A, 12A for mounting the two shelter lenses 11, 12 thereon and the adjustable bridge arrangement 30 is connected between two top edges of the two lens frames 11A, 12A. The two connecting members 13, 14 are affixed to upper positions of the two inner sides 111, 121 of the two lens frames 11A, 12A respectively. Moreover, the first embodiment is embodied to have two more connecting members 13A, 14A affixed to lower positions of the two inner sides 111, 121 of the two lens frames 11A, 12A respectively.

Each of the connecting members 13, 13A, 14, 14A comprises a clipping claw, as shown in FIG. 2, having an affixing end welded to the respective lens frame 11A, 12A and a bended end for mounting on the inner edge 211, 221 of the respective primary lens frame 21A, 22A of the primary spectacle frame 20.

As shown in FIGS. 1 and 2, the adjustable bridge arrangement 30 further comprises a first bridge arm 301 and a second bridge arm 302. Two outer ends of the first and second bridge arms 301, 302 are respectively connected to the lens frames 11A, 12A while two inner ends of the first and second bridge arms 301, 302 are respectively connected to the compression unit 31 so as to support the two lens frames 11A, 12A apart.

According to the first preferred embodiment, the two outer ends of the first and second bridge arms 301, 302 are welded to the top edges of the two lens frames 11A, 12A and the compression unit 31 is connected between the two inner ends of the first and second bridge arms 301, 302.

As shown in FIGS. 1, 3 and 4, the compression unit 31 of the adjustable bridge arrangement 30 comprises a tubular sleeve member 311 having a circular cross section and two end openings 311A, 311B, a first and a second pusher 312, 313 slidably disposed in the sleeve member 311, a resilient element 314 positioned between two inner ends of the first and second pushers 312, 313, and two end stoppers 315, 316 provided at the two end openings 311A, 311B for retaining the first and second pushers 312, 313 inside the sleeve member 311.

According to the first embodiment of the present invention, the two end stoppers 315, 316 are two inwardly bent round edges of the two ends of the sleeve member 311 so as to reduce the diameter of the two end openings 311A, 311B of the sleeve member 311 to smaller than the interior diameters of the sleeve member 311 and each of the first and second pushers 312, 313, but slightly larger than the diameter of the first and second bridge arms 301, 302. So that the resilient element 314 which is a compressive spring will press the first and second pushers 312, 313 towards the two end stoppers 315, 316 until two outer ends of the first and second pushers 312, 313 biasing against the two end stoppers 315, 316.

The two inner ends of the first and second bridge arms 301, 302 are respectively inserted into the sleeve member 311 via the two end openings 311A, 311B and integrally connected to the two outer ends of the first and second pushers 312, 313 respectively, so that the resilient element 314 disposed in the sleeve member 311 will reactively apply an urging pressure against the first and second bridge arms 301, 302 to maximize the bridge distance between the two shelter lenses 11, 12 of the universal shelter frame 10.

By pushing the two shelter lenses 11, 12 towards each other, the first and/or second bridge arms 301, 302 will be pressed into the sleeve member 311 so as to push the first and second pushers 312, 313 fittingly slide towards each other and compress the resilient element 314 within the sleeve member 311. Accordingly, the outer portions of the bridge arms 301, 302 will be inserted into the sleeve member 311 so that the length of the adjustable bridge arrangement 30 is contracted.

In other words, the bridge distance between the two shelter lenses 11, 12 is reduced for facilitating the user to align the connecting members 13, 13A, 14, 14A with the inner edges 211, 221 of the two primary lenses 21, 22 easily and precisely. Then, the user may simply release the compression force applied to the two shelter lenses 11, 12, i.e. the two bridge arms 301, 302, the resilient element 314 will automatically rebound the first and second pushers 312, 313 and the first and second bridge arms 301, 302 outwardly apart from each other until the clipping claws, i.e. the connecting members, 13, 13A, 14, 14A are fitting clipped on the inner edges 211, 221 of the primary lens frames 21A, 22A of the two primary lenses 21, 22.

Moreover, since the bridge distance between the shelter lenses 11, 12 is longer than the distance between the two primary lenses 21, 22 when the adjustable bridge arrangement 30 is fully extended, the resilient element 314 will still be compressed when the clipping claws 13, 13A, 14, 14A are well clipped on the primary lens frames 21A, 22A of the primary spectacle frame 20. Accordingly, the compressed resilient element 314 will continuously apply pressing forces to press the clipping claws 13, 13A, 14, 14A against primary lens frames 21A, 22A so as to enhance the connection of the clipping claws 13, 13A, 14, 14A with the primary lens frames 21A, 22A. Therefore, the attachment of the shelter frame 10 with the primary spectacle frame 20 can thus be further ensured even during the wearer's sporting activities.

In order to prevent the two shelter lenses 11, 12 from being twisted with each other, the adjustable bridge arrangement 30 of the present invention further comprises a guiding means 32 for retaining the first and second pushers 312, 313 to longitudinally slide along the sleeve member 311 without rotation.

As shown in FIGS. 3 and 4, the guiding means 32 comprises two pairs of guiding ridges 321 and a pair of guiding grooves 322. One pair of the guiding ridges 321 are longitudinally extended along two opposite sides of each of the first pusher 312 respectively while another pair of guiding ridges 321 are longitudinally extended along two opposite sides of the second pusher 313 respectively. The pair of guiding grooves 322 are longitudinally indented along two inner opposite sides of the sleeve member 311 respectively in such a manner that the two pairs of guiding ridges 321 are slidably inserted in the two guiding grooves 322 respectively, so that the first and second pushers 312, 313 as well as the first and second bridge arms 301, 302 are limited for axial movement but prevented from any rotation with respect to the sleeve member 311.

Referring to FIGS. 5 to 7 of the drawing, a shelter frame 10B according to a second preferred embodiment of the present invention is illustrated, wherein the lens frames for the two shelter lenses 11, 12 are eliminated and the adjustable bridge arrangement 30B and the connecting members 13B, 14B are constructed to be directly mounted on the shelter lenses 11, 12.

According to the second embodiment, the shelter frame 10B is a rimless frame. The wearer is able to choose a large piece of lens board in his or her favorite color and cuts out two lens pieces according to the size and shape of the primary lenses 21, 22 of the primary spectacle frame 20 to form the two shelter lenses 11, 12 for assembling the shelter frame 10B by himself or herself in DIY (do it yourself) manner.

As shown in FIG. 6, according to the second embodiment each of the connecting members 13B, 14B is specifically designed to have a mounting means for securely mounting the connecting member 13B, 14B to the inner side 111, 121 of the respective shelter lens 11, 12.

Each of the connecting members 13B, 14B, as shown in FIG. 6, comprises an E-shaped main body B1 forming a lens slot B2 defined between a divider wall B21 and an end wall B22 and a clipping claw B3. A screw hole B211 is provided through the divider wall B21.

Each of the connecting members 13B, 14B further comprises an adjustable screw set B4 which comprises a screw B41 screwing through the screw hole B211, an enlarged press head B42 connected to one end of the screw B41 and extended in the lens slot B2, and a locking nut B43 connected to another end of the screw B41. The inner side 111 or 121 of the shelter lens 11 or 12 is inserted into the lens slot B2. By screwing the screw B41 towards the shelter lens 11 or 12, the enlarged press head B42 will press the shelter lens 11 or 12 against the end wall B22 so as to securely mount the clipping claw B3 to the shelter lens 11 or 12. Therefore the clipping claw B3 can be attached to the primary lens 21, 22 of the primary spectacle frame 20 just as the clipping claws 13, 14 as disclosed in the above first embodiment.

In order to mount the connecting members 13B, 14B on the shelter lenses 11, 12, the respective shelter lens 11, 12 is inserted into the lens slot B2 of the connecting member 13B, 14B in a respective position. Push the adjustable screw set B4 toward the shelter lens 11, 12 until the press head B42 is firmly pressed on the shelter lens 11, 12 and rotate the locking nut B43 until it is tied enough to lock the screw B41 in a slidably rotatable manner. In other words, the shelter lens 11, 12 is sandwiched between the press head B42 and the end wall B22. Preferably, the press head B42 and the locking nut B43 are made of soft material such as rubber, plastic or foaming material so that the press head B42 and the locking nut B43 will not scratch or damage the shelter lens 11, 12.

Since the shelter frame 10B of the second embodiment is embodied as a rimless frame, the adjustable bridge arrangement 30B further comprises a pair of detachable connectors 33B for securely mounting the adjustable bridge arrangement 30B between the two shelter lenses 11, 12. As shown in FIG. 7, each of the connectors 33B has a structure similar to the connecting member 13B, 14B without the clipping claw B3. Accordingly, each of the connectors 33B comprises a U-shaped clamp body 33B1 integrally connected to the free end of the respective bridge arm 301, 302 to define a lens groove 33B1 adapted for clamping a top edge of the shelter lens 11, 12 therein. In order to more securely and firmly mount on the shelter lens 11, 12, the adjustable screw set B4 of the connecting member 13B, 14B can be used to apply pressing force against the shelter lens 11, 12. By means of the second embodiment as disclosed above, the user can made shelter frame for his or her current spectacle frame anytime.

Figures 8, 9:
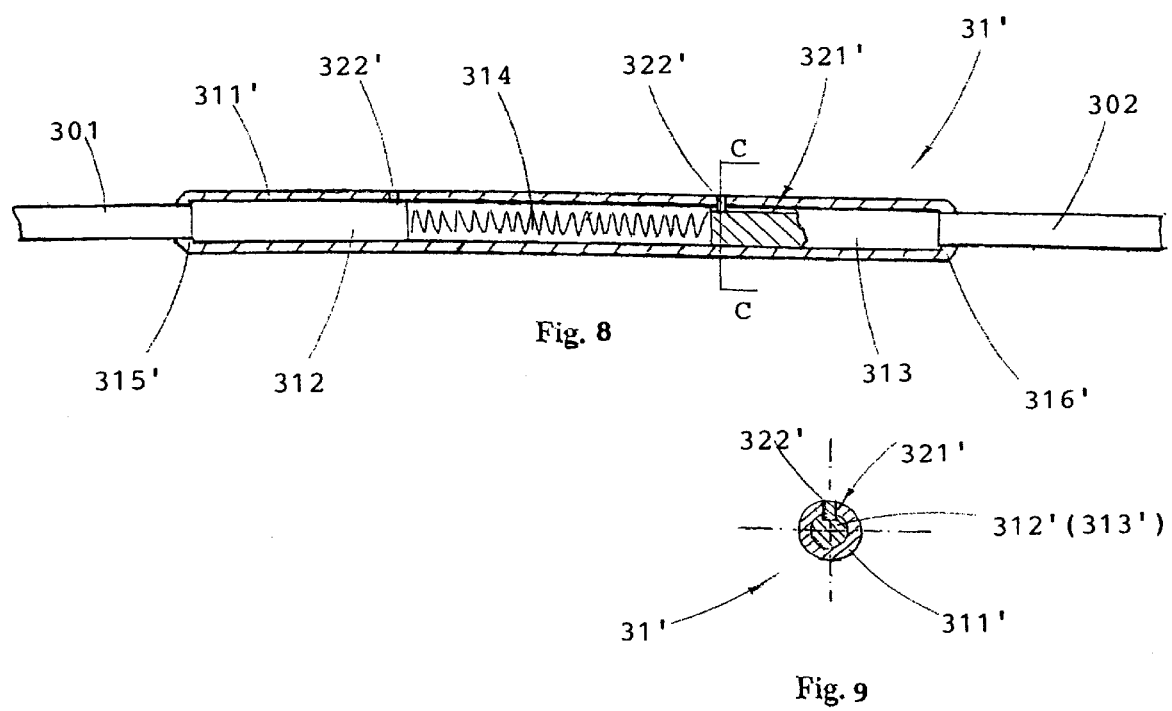
FIG. 8 is a partially sectional view of a first alternative mode of the adjustable bridge arrangement according to the above first and second preferred embodiments of the present invention.
FIG. 9 is a cross sectional view of the first alternative mode of the adjustable bridge arrangement according to the above first and second preferred embodiments of the present invention, illustrating a cross sectional structure along the section line C—C in FIG. 8.

Referring to FIGS. 8 and 9 of the drawings, a first alternative mode of the compression unit 31 of the adjustable bridge arrangement 30 as mentioned in the above first and second embodiments is illustrated, wherein the guiding ridges 321 protruded on the first and second pushers 312, 313 are simply replaced by a single guiding slot 321' extended along a top side of each of the first and second pushers 312', 313' of the compression unit 31'. Correspondingly, the guiding grooves 322 of the sleeve member 311 as mentioned above are eliminated wherein the sleeve member 311' of the compression unit 31' is simply made as a round tube form. However, the compression unit 31' further comprises a pair of guiding pins 322' inwardly protruded at a left and a right portion of the sleeve member 311'. The two guiding pins 322' are arranged to insert into the guiding slot 321' so as to limit the first and second pushers 312, 313 in axial linear movement and prevent from any rotation movement. Moreover, the two end stoppers 315', 316' are two individual rings screwed to the two ends of the sleeve member 311'.

Referring to FIGS. 10 and 11, a second alternative mode of the compression unit 31" is illustrated, wherein each of the first and second pushers 312", 313" has at least one flat side edge 315" extended along the length thereof The sleeve member 311" is made from a circular tube, wherein after inserting the first and second pushers 312", 313" into the two ends portions of the circular sleeve member 311", at least one longitudinal side of the sleeve member 311" is deformed by pressing inwardly to form a corresponding flat side edge 316" overlapping the flat side edges 315" of the two pushers 312", 313", so as to prevent the pushers 312", 313" from any rotation movement with respect to the sleeve member 311" and merely permit axial linear movement of the pushers 312", 313". As shown in FIG. 11, the present invention can substantially form two parallel flat side edges 315" at two opposite sides of each of the pushers 312", 313" and two opposite sides of the sleeve member 311" and also correspondingly made to have two parallel flat side edges 316" respectively.

Figure 12:
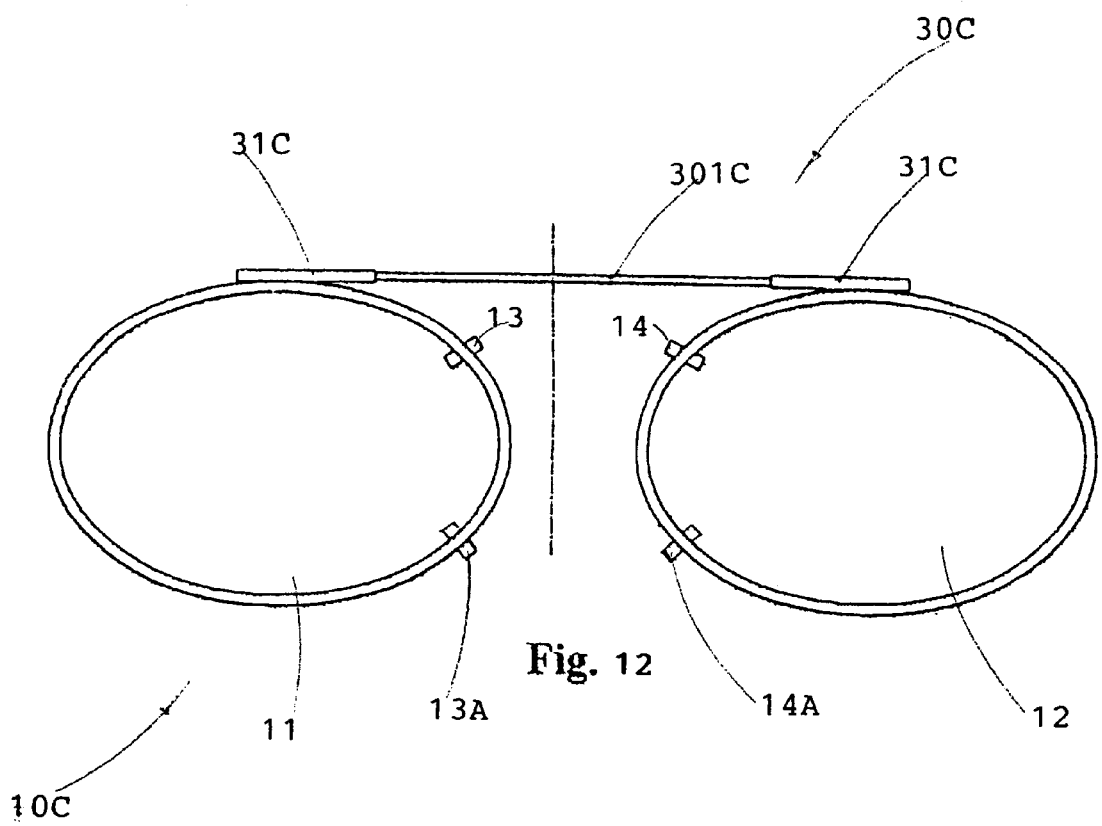
FIG. 12 is a front view of a universal shelter frame with adjustable bridge arrangement according to a third preferred embodiment of the present invention.

Referring to FIG. 12, a universal shelter frame 10C according to a third preferred embodiment of the present invention is illustrated, wherein adjustable bridge arrangement 30C comprises two compression units 31C connected to the two shelter lenses 11, 12 respectively and a bridge arm 301C extended between the two compression units 31C. The compression units 31C can be welded to top edges of the two lens frames 11A, 12A as shown in FIG. 12.

Figure 13:
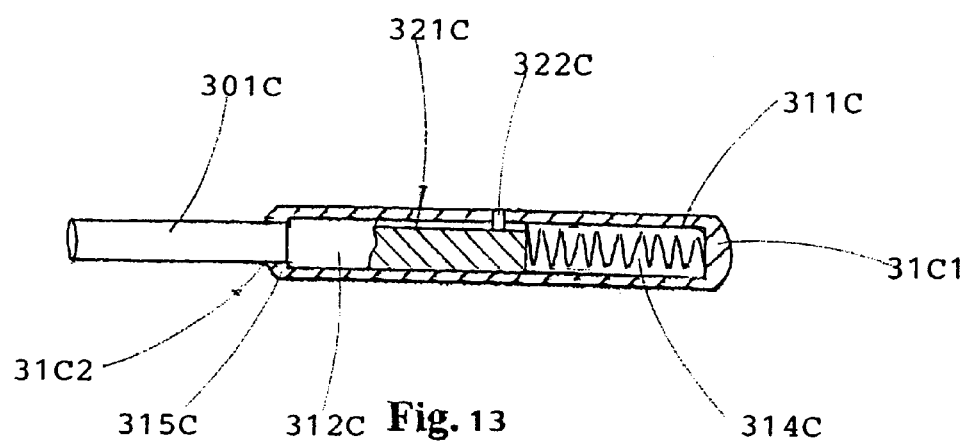
FIG. 13 is a partially sectional view of the compression unit according to the above third preferred embodiment of the present invention.

As shown in FIG. 13, each of the compression units 31C comprises a sleeve member 311C having a closed end 31C1 and an opened end forming an end stopper 315, a pusher 312C slidably disposed inside the sleeve member 311C, and a resilient element 314C disposed between the pusher 312C and the closed end 31C1 within the sleeve member 311C.

The end stopper 315C is an inwardly bent round edge of the opened end of the sleeve member 311C so as to reduce the diameter to form an end opening 31C2 for the sleeve member 311C, so that the resilient element 314C which is also a compressive spring will press the pusher 312C towards the end stopper 315C.

Like the compression unit 31' as shown in FIGS. 8 and 9, the pusher 312C of the compression unit 31C of the third embodiment also has a guiding slot 321C extended along a top side of the pusher 312C of the compression unit 31C. Correspondingly, the compression unit 31C further comprises a guiding pin 322C inwardly protruded from the sleeve member 311C. The guiding pin 322C is arranged to insert into the guiding slot so as to limit the pusher 312C in axial linear movement and prevent from any rotation movement.

According to the third preferred embodiment of the present invention, the connecting members 13, 13A, 14, 14A as disclosed in the first embodiment (as shown in FIGS. 1 and 2) are also used in the third embodiment for mounting the shelter frame 10C on the primary spectacle frame 20. When the two shelter lenses 11, 12 are pressed towards each other, the two resilient elements 314C of the two compression units 31C will be compressed and two end portions of the bridge arm 301C are pressed to insert into the two sleeve members 311C respectively so as to reduce the bridge distance between the two shelter lenses 11, 12 for facilitating the shelter frame 10C to mount on the primary spectacle frame 20. Similarly, the two compressed resilient elements 314C also provide a pressing force for urging the connecting members 13, 13A, 14, 14A against the primary lens frames 21, 22 of the primary spectacle frame 20 so as to enhance the attachment of the shelter frame 10C with the primary spectacle frame 20.

It is worth to mention that the pusher 312C and the sleeve member 311C can also be made to have square shaped cross section as shown in FIG. 11. Also, the shelter frame 10C of the third embodiment can also be rimless frame, wherein the detachable connecting members 13B, 14B as disclosed in the above second embodiment as shown in FIGS. 5 to 7 can be used in the third embodiment. Moreover, two detachable connector 33B as shown in FIG. 7 can also be used to affixed the two compression units 31C to the two rimless shelter lenses 11, 12 of the third embodiment.

Figure 14:
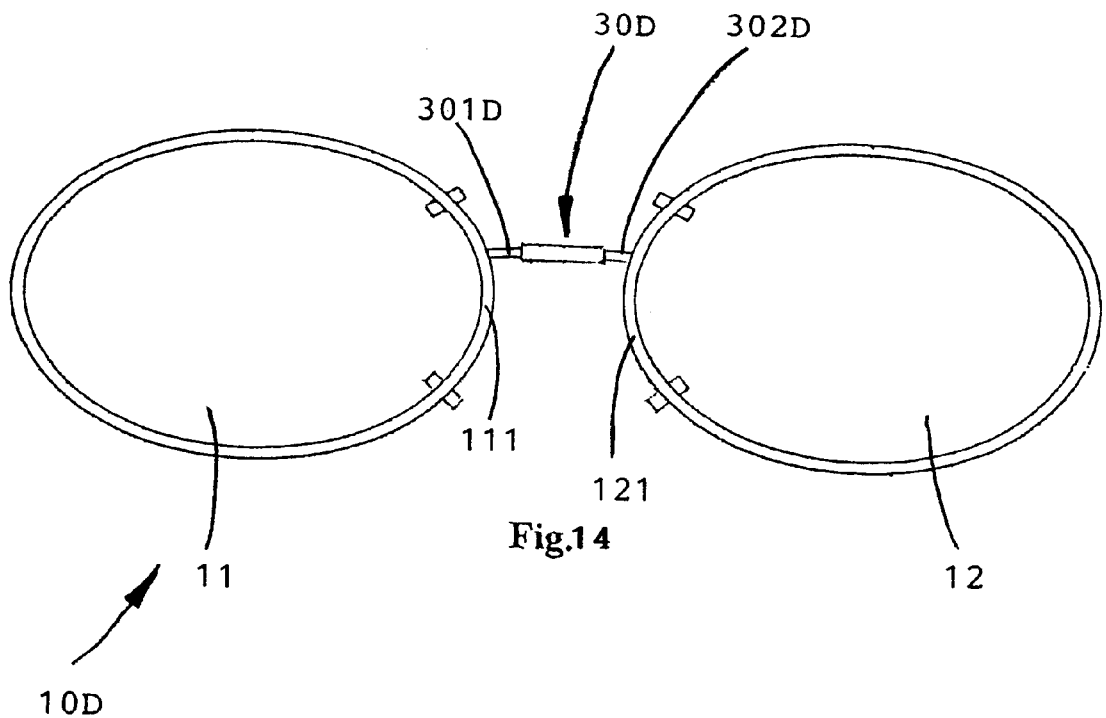
FIG. 14 is a front view of a universal shelter frame with adjustable bridge arrangement according to a fourth preferred embodiment of the present invention.
Figure 15:
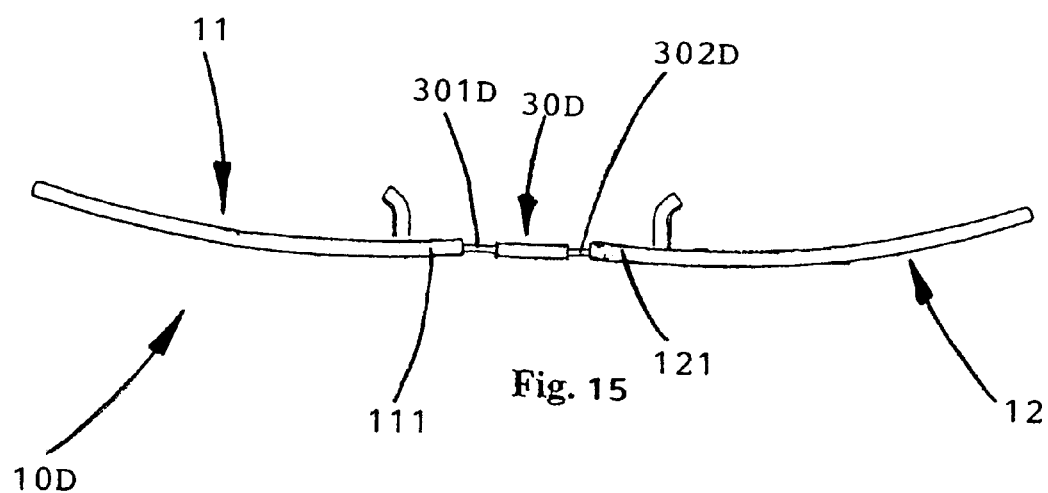
FIG. 15 is a top view of the universal shelter frame with adjustable bridge arrangement according to the above fourth preferred embodiment of the present invention.

Referring to FIGS. 14 and 15, a universal shelter frame 10D according to a fourth preferred embodiment of the present invention is illustrated, which is an alternative mode of the above first embodiment, wherein the adjustable bridge arrangement 30D is embodied to be connected between the two inner sides 111, 121 of the two shelter lenses 11, 12. Therefore, shorter bridge arms 301D, 302D can be used.

Figure 16:
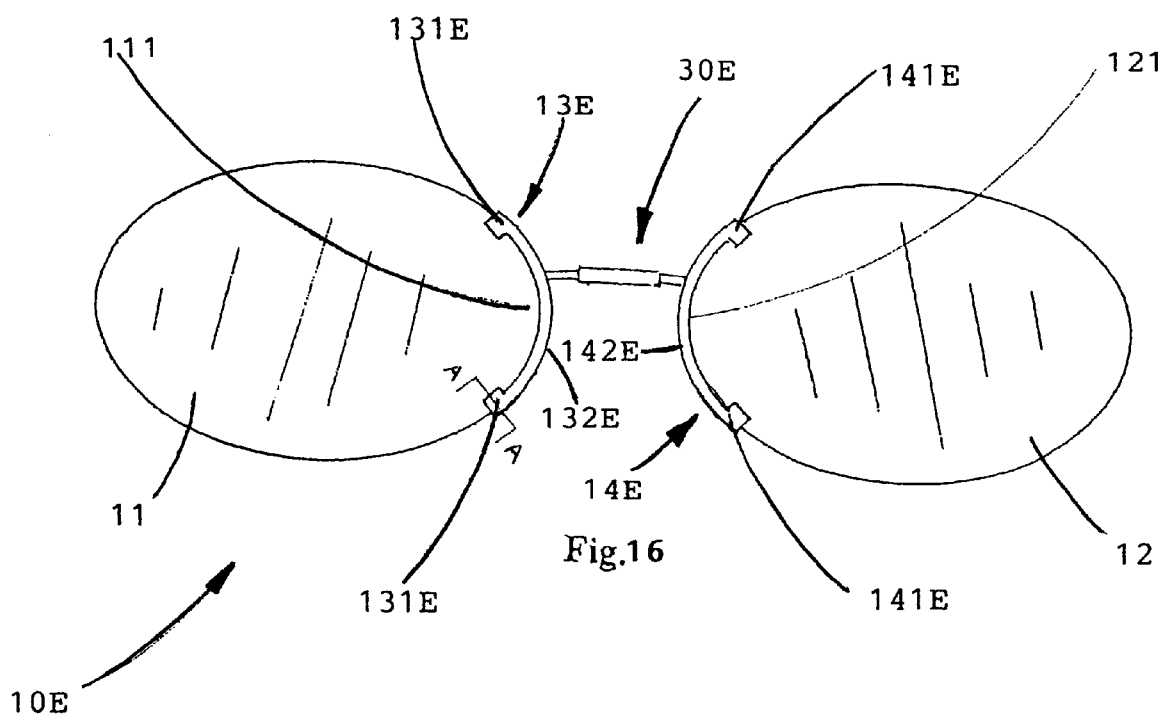
FIG. 16 is a front view of a universal shelter frame with adjustable bridge arrangement according to a fifth preferred embodiment of the present invention.
Figure 17:
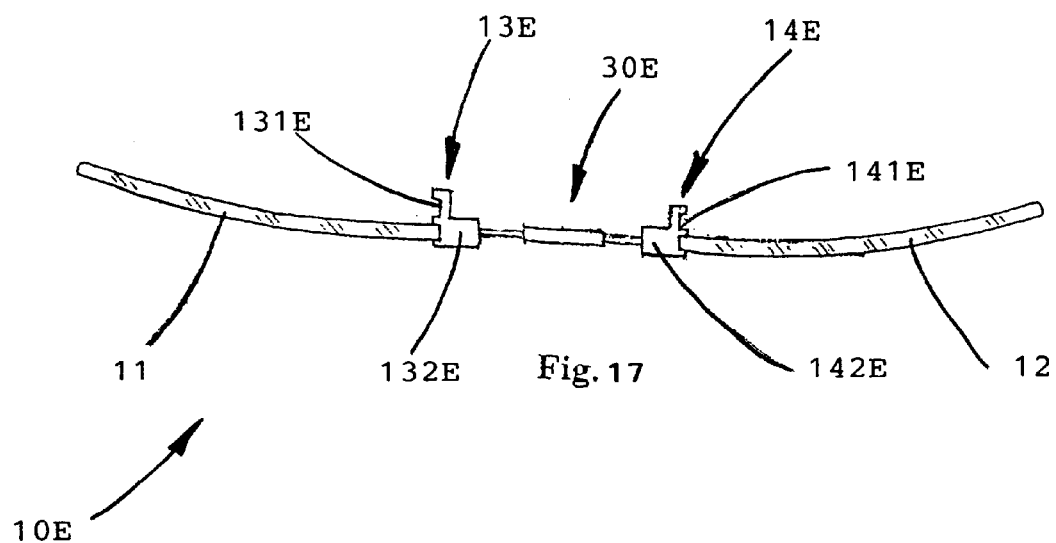
FIG. 17 is a top view of the universal shelter frame with adjustable bridge arrangement according to the above fifth preferred embodiment of the present invention.

Referring to FIGS. 16 and 17, a universal shelter frame 10E according to a fifth preferred embodiment of the present invention is illustrated, which is an alternative mode of the above first and second embodiments, wherein the two connecting members 13E, 14E each comprises two clipping claws 131E, 141E and a connection arm 132E, 142E extended between the two clipping claws 131E, 141E. The two clipping claws 131E or 141E are respectively clipped to an upper position and a lower position of the inner side 111, 121 of the respective shelter lens 11, 12. The adjustable bridge arrangement 30E, which can be the structure disclosed in the above embodiments, as shown in FIGS. 3–4, 8–9, or 10–11, is connected between the two connection arms 132E, 142E.

Figure 18:
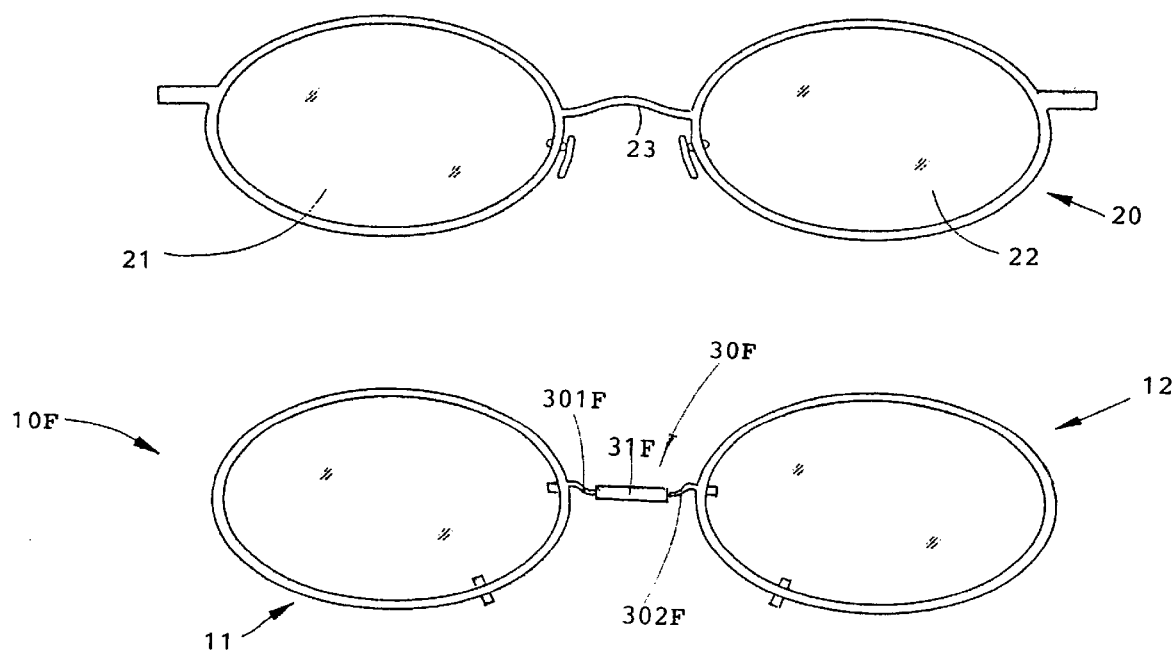
FIG. 18 is a front view illustrating a primary spectacle frame and a universal shelter frame with adjustable bridge arrangement according to a sixth preferred embodiment of the present invention.
Figure 19:
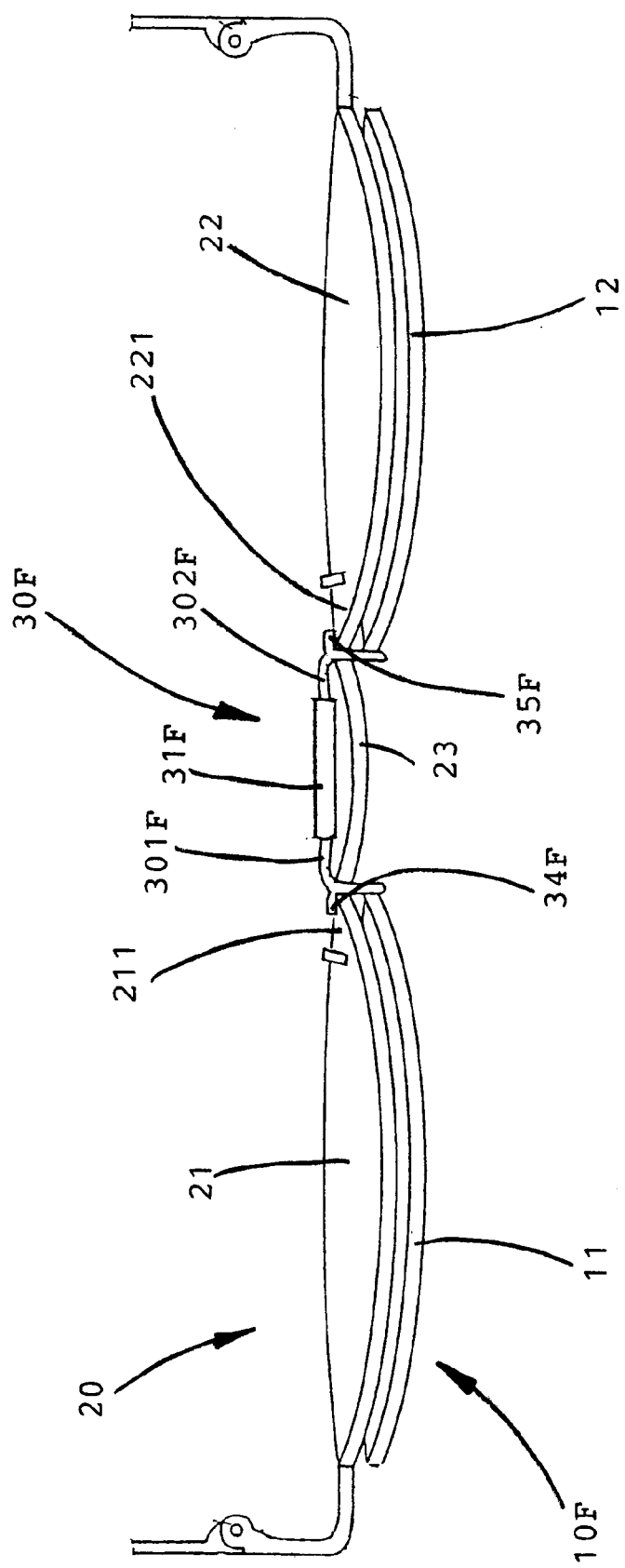
FIG. 19 is a top view illustrating the universal shelter frame mounted on the primary spectacle frame according to the above sixth preferred embodiment of the present invention.
Figure 20:
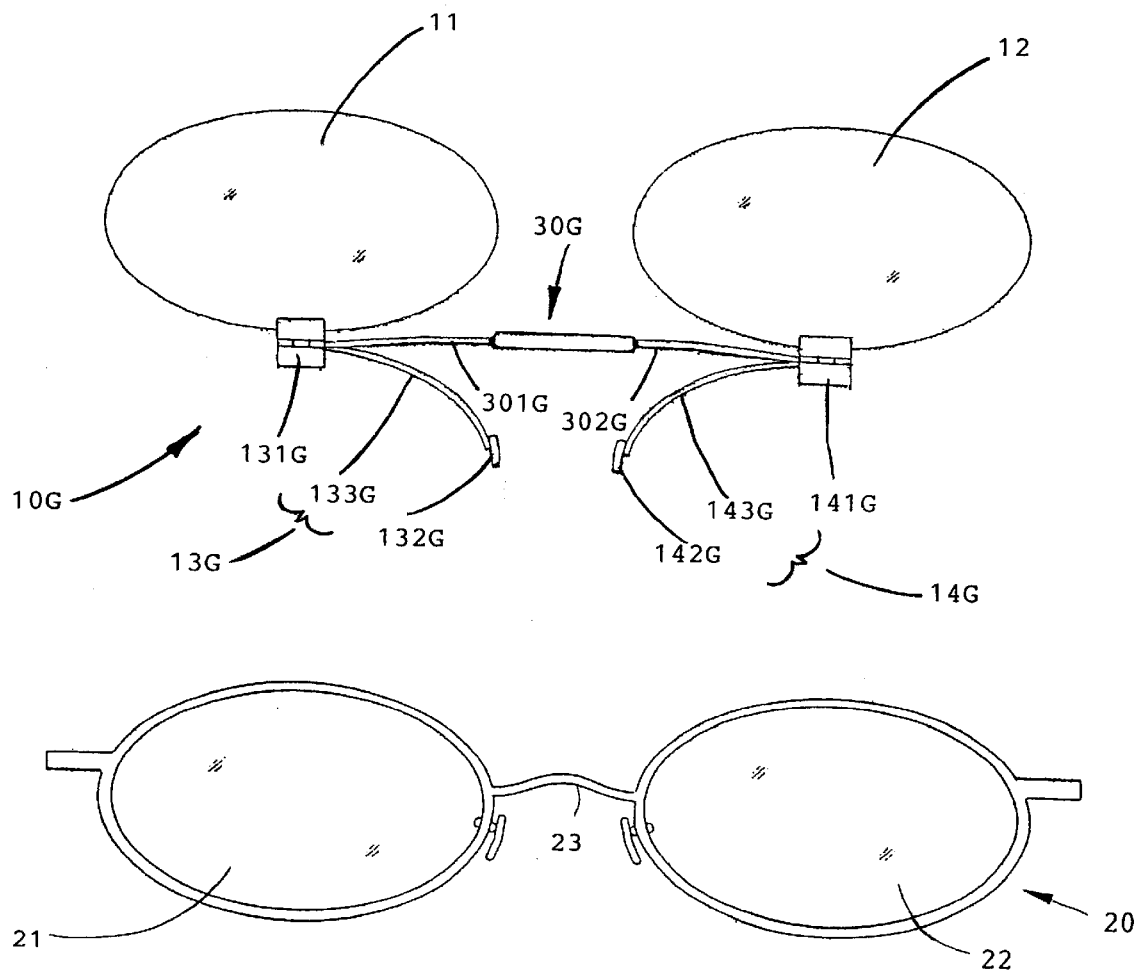
FIG. 20 is a front view illustrating a primary spectacle frame and a universal shelter frame with adjustable bridge arrangement according to a seventh preferred embodiment of the present invention.

Referring to FIGS. 18 and 19, a universal shelter frame 10F according to a sixth preferred embodiment of the present invention is illustrated, which is an alternative mode of the above fourth embodiment, wherein the first and second bridge arms 301F, 302F of the adjustable bridge arrangement 30F are made in L-shape so as to rearwardly support the compression unit 31F behind the bridge 23 of the primary spectacle frame 20 when the shelter frame 10F is mounted on the primary spectacle frame 20 as shown in FIG. 19. In which, the two bridge arms 301F, 302F are rearwardly rested on the bridge 23 of the primary spectacle frame 20, the shelter frame 10F can be better supported. Moreover, a claw 34F, 35F is outwardly extended from each of the bridge arms 301F, 302F for clipping to the inner edge 211, 221 of the primary spectacle frame 20 so as to enforce the attachment of the basic connecting members 13, 14, which are affixed to the inner sides 111, 121 of the two shelter lenses 11, 12, with the primary lenses 21, 22.

Figure 21:
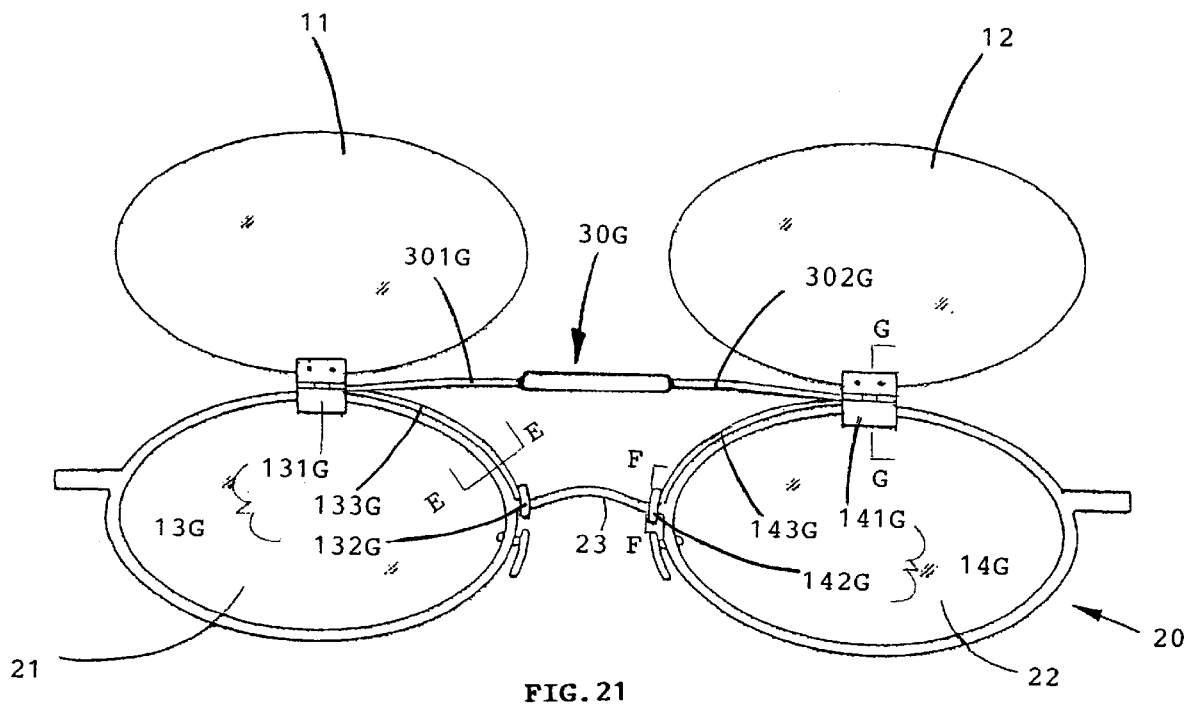
FIG. 21 is a front view illustrating the universal shelter frame mounted on the primary spectacle frame according to the above seventh preferred embodiment of the present invention.
Figure 22:
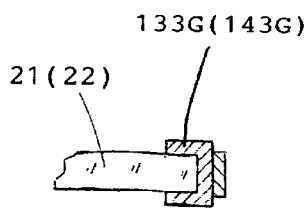
FIG. 22 is a sectional view along the sectional line E—E in FIG. 21.
Figure 23:
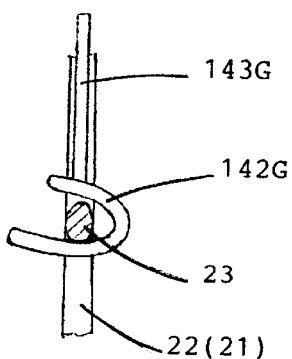
FIG. 23 is a sectional view along the sectional line F—F in FIG. 21.
Figure 24:
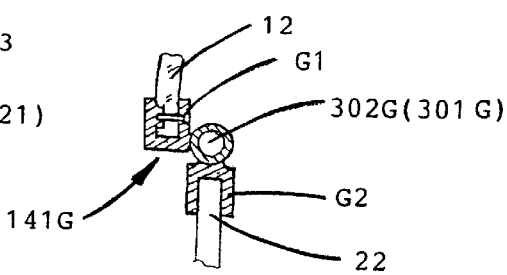
FIG. 24 is a sectional view along the sectional line G—G in FIG. 21.

Referring to FIGS. 20 to 24, a universal shelter frame 10G according to a seventh preferred embodiment of the present invention, wherein the adjustable bridge arrangement 30G can be any one of the above adjustable bridge arrangement as shown in FIGS. 3–4, 8–9, or 10–11. However, each of the two connecting members 13G comprises a hinge 131G, 141G connected to the free end of the respective bridge arm 301G, 302G, a attachment member 132G, 142G having a hook shape structure adapted for hooking to the bridge 23 of the primary spectacle frame 20 (as shown in FIG. 23), and a curved extension arm 133G, 143G having a U-shaped cross section for mounting on the upper inner side of the respectively primary lens 21, 22 of the primary spectacle frame 20 (as shown in FIG. 22). As shown in FIGS. 21 and 24, each of the hinge 131G, 141G comprises a first half G1 affixed to the respective shelter lens 11, 12 and a second half G2 for mounting on a top side of the respective primary lens 21, 22. Accordingly, the wearer can selectively flip down two shelter lenses 11, 12 to position in front of the two primary lenses 21, 22 or, alternatively, flip up to position above the primary spectacle frame 20 as shown in FIG. 21.

In view of the above preferred embodiments of the present invention, the user may simply use one hand to hold one side of the shelter frame, and correspondingly mount the respective connecting member(s) at the other side of the shelter frame on the primary spectacle frame in position. Press the shelter frame in order to compress the resilient element inside the adjustable bridge arrangement such that the bridge distance between the two shelter lenses of the shelter frame will be reduced. Mount the rest of the connecting member(s) on the corresponding primary spectacle frame and release the hand held to the shelter frame. When the compression force is released, the compressed resilient element will rebound and push the two pushers toward the end stoppers of the sleeve member. So, the shelter frame will be securely mounted on the primary spectacle frame in which the attachment between the connecting members and the inner sides of the two primary lenses of the primary spectacle frame is further enhanced by the urging pressure applied by the resilient element. To detach the shelter frame from the primary spectacle frame, simply reverse the steps mentioned above. Also, the detaching procedure only requires one hand to operate.

Accordingly, the present invention can substantially achieve the following advantages:

1. The user can easily attach the universal shelter frame to the primary spectacle frame with one hand, even when the primary spectacle frame is still wearing on the user's face.

2. The user can easily detach the universal shelter frame from the primary spectacle frame with one hand, even when the primary spectacle frame is still wearing on the user's face.

3. After the universal shelter frame is attached to the primary spectacle frame, the adjustable bridge arrangement can enhance the attachment of the universal shelter frame on the primary spectacle frame by pressing the claws against the lens frame of the primary spectacle frame.

4. Since the adjustable bridge arrangement produces an outward force pressing the inner claws of the universal shelter frame against the primary spectacle frame, the outer claws of the conventional shelter frame can thus be eliminated in the present invention.

5. The present invention can reduce the possibility of scratching the lenses by the clipping claw because lesser clipping claws are required in the present invention.

6. The wearer can easily make his or her favorite sun lenses according to his or her own original primary spectacles.

7. The shelter frame of the present invention is adapted to fit various kinds of primary spectacle frames with different styles and sizes because the length of the adjustable bridge arrangement can be contracted to fit the different length of bridges of different kinds of primary spectacle frames.

What is claimed is:

1. A shelter frame for attaching to a primary spectacle frame having two primary lenses and a bridge connected therebetween, wherein said shelter frame comprises:

a pair of shelter lenses each of which has an inner side facing with each other;

a pair of connecting members which are provided at said two inner sides of said two shelter lenses respectively; and an adjustable bridge arrangement connected between said two shelter lenses together for supporting said two shelter lenses apart and defining a bridge distance between said two shelter lenses, wherein said bridge distance is normally longer than a distance between said two primary lenses of said primary spectacle frame, wherein said adjustable bridge arrangement comprises at least one compression unit comprising a tubular sleeve member having two end openings, a first and a second pusher slidably disposed in said sleeve member, a resilient element positioned between two inner ends of said first and second pushers, and two end stoppers provided at said two end openings for retaining said first and second pushers inside said sleeve member, thereby said adjustable bridge arrangement is adapted for enabling said adjustable bridge arrangement to be compressed to contract said bridge distance in order to mount said shelter frame on said primary spectacle frame by attaching said two connecting members to two inner edges of said primary lenses of said primary spectacle frame respectively, moreover said contracted adjustable bridge arrangement provides an urging force to press said two connecting members outwardly against said two inner edges of said two primary lenses so as to firmly mount said shelter frame on said primary spectacle frame.

2. The shelter frame, as recited in claim 1, wherein said adjustable bridge arrangement further comprises a first bridge arm and a second bridge arm, two outer ends of said first and second bridge arms being respectively attached to said inner sides of said two shelter lenses while two inner ends of said first and second bridge arms being respectively inserted into said sleeve member via said two end openings and integrally connected to said two outer ends of said first and second pushers respectively, so as to support said two lens frames apart, so that said resilient element disposed in said sleeve member reactively applies an urging pressure against said first and second bridge arms to maximize said bridge distance between said two shelter lenses of said shelter frame.

3. The shelter frame, as recited in claim 2, wherein said two end stoppers are two inwardly bent round edges of said two ends of said sleeve member so as to reduce said diameter of said two end openings of said sleeve member to smaller than said interior diameters of said sleeve member and each of said first and second pushers but slightly larger than said diameter of said first and second bridge arms.

4. The shelter frame, as recited in claim 3, wherein each of the first and second pushers has at least one flat side edge extended along a length of thereof and said sleeve member is made from a circular tube, wherein after inserting said first and second pushers into two ends portions of said circular sleeve member respectively, at least one longitudinal side of said sleeve member is deformed by pressing inwardly to form a corresponding flat side edge overlapping said flat side edges of the two pushers, so as to prevent said first and second pushers from any rotation movement with respect to said sleeve member and merely permit axial linear movement of said first and second pushers.

5. The shelter frame, as recited in claim 2, wherein said two end stoppers are two individual rings screwed to said two ends of said sleeve member.

6. The shelter frame, as recited in claim 5, wherein each of the first and second pushers has at least one flat side edge extended along a length of thereof and said sleeve member is made from a circular tube, wherein after inserting said first and second pushers into two ends portions of said circular sleeve member respectively, at least one longitudinal side of said sleeve member is deformed by pressing inwardly to form a corresponding flat side edge overlapping said flat side edges of the two pushers, so as to prevent said first and second pushers from any rotation movement with respect to said sleeve member and merely permit axial linear movement of said first and second pushers.

7. The shelter frame, as recited in claim 2, wherein each of the first and second pushers has at least one flat side edge extended along a length of thereof and said sleeve member is made from a circular tube, wherein after inserting said first and second pushers into two ends portions of said circular sleeve member respectively, at least one longitudinal side of said sleeve member is deformed by pressing inwardly to form a corresponding flat side edge overlapping said flat side edges of the two pushers, so as to prevent said first and second pushers from any rotation movement with respect to said sleeve member and merely permit axial linear movement of said first and second pushers.

8. The shelter frame, as recited in claim 7, wherein said shelter frame further comprises two lens frames for mounting said two shelter lenses thereon and said adjustable bridge arrangement is connected between said two lens frames, wherein said two connecting members are affixed to said two inner sides of said two lens frames respectively.

9. The shelter frame, as recited in claim 8, wherein each of said connecting members comprises a clipping claw having an affixing end affixed to said respective lens frame and a bended end for mounting on said inner edge of said respective primary lens frame of said primary spectacle frame.

10. The shelter frame, as recited in claim 7, wherein each of said connecting members comprises an E-shaped main body forming a lens slot defined between a divider wall and an end wall and a clipping claw, wherein said connecting member is affixed to said respective shelter frame by clamping said inner side of said shelter frame in said lens slot, so that said shelter frame is capable of attaching on said primary spectacle frame by clipping said clipping claws of said connecting members to said two inner edges of said primary spectacle frame respectively, moreover said adjustable bridge arrangement further comprises a pair of detachable connectors for securely mounting said adjustable bridge arrangement between said two shelter lenses, each of said connectors comprising a U-shaped clamp body integrally connected to said free end of said respective bridge arm to define a lens groove adapted for clamping to a side edge of said shelter lens therein.

11. The shelter frame, as recited in claim 10, wherein a screw hole being provided through said divider wall, each of said connecting members further comprising an adjustable screw set which comprises a screw screwing through said screw hole, an enlarged press head connected to one end of said screw and extended in said lens slot, and a locking nut connected to another end of said screw, said lens slot being adapted for said inner side of said respective shelter lens to be inserted therein, wherein by screwing said screw towards said shelter lens, said enlarged press head presses said shelter lens against said end wall so as to securely mount said clipping claw to said respective shelter lens.

12. The shelter frame, as recited in claim 2, wherein said sleeve member has a circular tube cross section and said first and second pushers each also has a circular cross section.

13. The shelter frame, as recited in claim 12, wherein said adjustable bridge arrangement of said present invention further comprises a guiding means for retaining said first and second pushers to longitudinally slide along said sleeve member without rotation.

14. The shelter frame, as recited in claim 13, wherein said guiding means comprises at least two of guiding ridges and at least a guiding groove, said two guiding ridges are longitudinally extended along said first and second pushers respectively while said guiding groove is longitudinally indented along an inner side of said sleeve member respectively in such a manner that said two guiding ridges are slidably inserted in said guiding groove, so that said first and second pushers as well as said first and second bridge arms are limited for axial linear movement but prevented from any rotation movement with respect to said sleeve member.

15. The shelter frame, as recited in claim 14, wherein said shelter frame further comprises two lens frames for mounting said two shelter lenses thereon and said adjustable bridge arrangement is connected between said two lens frames, wherein said two connecting members are affixed to said two inner sides of said two lens frames respectively.

16. The shelter frame, as recited in claim 15, wherein each of said connecting members comprises a clipping claw having an affixing end affixed to said respective lens frame and a bended end for mounting on said inner edge of said respective primary lens frame of said primary spectacle frame.

17. The shelter frame, as recited in claim 14, wherein each of said connecting members comprises an E-shaped main body forming a lens slot defined between a divider wall and an end wall and a clipping claw, wherein said connecting member is affixed to said respective shelter frame by clamping said inner side of said shelter frame in said lens slot, so that said shelter frame is capable of attaching on said primary spectacle frame by clipping said clipping claws of said connecting members to said two inner edges of said primary spectacle frame respectively, moreover said adjustable bridge arrangement further comprises a pair of detachable connectors for securely mounting said adjustable bridge arrangement between said two shelter lenses, each of said connectors comprising a U-shaped clamp body integrally connected to said free end of said respective bridge arm to define a lens groove adapted for clamping to a side edge of said shelter lens therein.

18. The shelter frame, as recited in claim 17, wherein a screw hole being provided through said divider wall, each of said connecting members further comprising an adjustable screw set which comprises a screw screwing through said screw hole, an enlarged press head connected to one end of said screw and extended in said lens slot, and a locking nut connected to another end of said screw, said lens slot being adapted for said inner side of said respective shelter lens to be inserted therein, wherein by screwing said screw towards said shelter lens, said enlarged press head presses said shelter lens against said end wall so as to securely mount said clipping claw to said respective shelter lens.

19. The shelter frame, as recited in claim 13, wherein a single guiding slot is extended along a top side of each of said first and second pushers of said compression unit, and said guiding means comprises a pair of guiding pins, which inwardly protruded at a left and a right portion of said sleeve member, being arranged to insert into said guiding slot so as to limit said first and second pushers in axial linear movement and prevent from any rotation movement with respect to said sleeve member.

20. The shelter frame, as recited in claim 19, wherein said shelter frame further comprises two lens frames for mounting said two shelter lenses thereon and said adjustable bridge arrangement is connected between said two lens frames, wherein said two connecting members are affixed to said two inner sides of said two lens frames respectively.

21. The shelter frame, as recited in claim 20, wherein each of said connecting members comprises a clipping claw having an affixing end affixed to said respective lens frame and a bended end for mounting on said inner edge of said respective primary lens frame of said primary spectacle frame.

22. The shelter frame, as recited in claim 19, wherein each of said connecting members comprises an E-shaped main body forming a lens slot defined between a divider wall and an end wall and a clipping claw, wherein said connecting member is affixed to said respective shelter frame by clamping said inner side of said shelter frame in said lens slot, so that said shelter frame is capable of attaching on said primary spectacle frame by clipping said clipping claws of said connecting members to said two inner edges of said primary spectacle frame respectively, moreover said adjustable bridge arrangement further comprises a pair of detachable connectors for securely mounting said adjustable bridge arrangement between said two shelter lenses, each of said connectors comprising a U-shaped clamp body integrally connected to said free end of said respective bridge arm to define a lens groove adapted for clamping to a side edge of said shelter lens therein.

23. The shelter frame, as recited in claim 22, wherein a screw hole being provided through said divider wall, each of said connecting members further comprising an adjustable screw set which comprises a screw screwing through said screw hole, an enlarged press head connected to one end of said screw and extended in said lens slot, and a locking nut connected to another end of said screw, said lens slot being adapted for said inner side of said respective shelter lens to be inserted therein, wherein by screwing said screw towards said shelter lens, said enlarged press head presses said shelter lens against said end wall so as to securely mount said clipping claw to said respective shelter lens.

24. The shelter frame, as recited in claim 13, wherein said shelter frame further comprises two lens frames for mounting said two shelter lenses thereon and said adjustable bridge arrangement is connected between said two lens frames, wherein said two connecting members are affixed to said two inner sides of said two lens frames respectively.

25. The shelter frame, as recited in claim 24, wherein each of said connecting members comprises a clipping claw having an affixing end affixed to said respective lens frame and a bended end for mounting on said inner edge of said respective primary lens frame of said primary spectacle frame.

26. The shelter frame, as recited in claim 13, wherein each of said connecting members comprises an E-shaped main body forming a lens slot defined between a divider wall and an end wall and a clipping claw, wherein said connecting member is affixed to said respective shelter frame by clamping said inner side of said shelter frame in said lens slot, so that said shelter frame is capable of attaching on said primary spectacle frame by clipping said clipping claws of said connecting members to said two inner edges of said primary spectacle frame respectively, moreover said adjustable bridge arrangement further comprises a pair of detachable connectors for securely mounting said adjustable bridge arrangement between said two shelter lenses, each of said connectors comprising a U-shaped clamp body integrally connected to said free end of said respective bridge arm to define a lens groove adapted for clamping to a side edge of said shelter lens therein.

27. The shelter frame, as recited in claim 26, wherein a screw hole being provided through said divider wall, each of said connecting members further comprising an adjustable screw set which comprises a screw screwing through said screw hole, an enlarged press head connected to one end of said screw and extended in said lens slot, and a locking nut connected to another end of said screw, said lens slot being adapted for said inner side of said respective shelter lens to be inserted therein, wherein by screwing said screw towards said shelter lens, said enlarged press head presses said shelter lens against said end wall so as to securely mount said clipping claw to said respective shelter lens.

28. The shelter frame, as recited in claim 2, wherein each of said two connecting members comprises two clipping claws and a connection arm extended between said two clipping claws, said two clipping claws being respectively clipped to an upper position and a lower position of said inner side said respective shelter lens, wherein said adjustable bridge arrangement is connected between said two connection arms.

29. The shelter frame, as recited in claim 2, wherein said first and second bridge arms of said adjustable bridge arrangement are made in L-shape so as to rearwardly support said compression unit behind said bridge of said primary spectacle frame when said shelter frame is mounted on said primary spectacle frame, wherein a claw is outwardly extended from each of said bridge arms for clipping to said inner edge of said primary spectacle frame.

30. The shelter frame, as recited in claim 2, wherein each of said two connecting members comprises a hinge connected to said free end of said respective bridge arm, a attachment member having a hook shape structure adapted for hooking to said bridge of said primary spectacle frame, and a curved extension arm having a U-shaped cross section for mounting on said upper inner side of said respectively primary lens of said primary spectacle frame, wherein each of said hinge comprises a first half affixed to said respective shelter lens and a second half for mounting on a top side of said respective primary lens.

31. A shelter frame for attaching to a primary spectacle frame having two primary lenses and a bridge connected therebetween, wherein said shelter frame comprises:

a pair of shelter lenses each of which has an inner side facing with each other;

a pair of connecting members which are provided at said two inner sides of said two shelter lenses respectively; and an adjustable bridge arrangement connected between said two shelter lenses together for supporting said two shelter lenses apart and defining a bridge distance between said two shelter lenses, wherein said bridge distance is normally longer than a distance between said two primary lenses of said primary spectacle frame, wherein said adjustable bridge arrangement comprises two compression units connected to said two shelter lenses respectively and a bridge arm extended between said two compression units, wherein each of said compression units comprises a sleeve member having a closed end and an opened end forming an end stopper, a pusher slidably disposed inside said sleeve member, and a resilient element disposed between said pusher and said closed end within said sleeve member, wherein two ends of said bridge arms are integrally connected to said two pushers of said two compression units respectively, thereby said adjustable bridge arrangement is adapted for enabling said adjustable bridge arrangement to be compressed to contract said bridge distance in order to mount said shelter frame on said primary spectacle frame by attaching said two connecting members to two inner edges of said primary lenses of said primary spectacle frame respectively, moreover said contracted adjustable bridge arrangement provides an urging force to press said two connecting members outwardly against said two inner edges of said two primary lenses so as to firmly mount said shelter frame on said primary spectacle frame.

32. The shelter frame, as recited in claim 31, wherein said pusher of said compression unit having has a guiding slot extended along a top side of said pusher of said compression unit, and correspondingly, said compression unit further comprises a guiding pin inwardly protruded from said sleeve member, wherein said guiding pin is arranged to insert into said guiding slot so as to limit said pusher in axial linear movement and prevent from any rotation movement.

33. The shelter frame, as recited in claim 32, wherein said end stopper is an inwardly bent round edge of said opened end of said sleeve member so as to reduce said diameter to form an end opening for said sleeve member, so that said resilient element which is a compressive spring presses said pusher towards said end stopper.

* * * * *